United States Patent
Ohkawa et al.

(10) Patent No.: US 6,800,681 B2
(45) Date of Patent: Oct. 5, 2004

(54) BASIC MAGNESIUM SULFATE FIBER-REINFORCED POLYPROPYLENE RESIN COMPOSITION AND INJECTION MOLDED ARTICLE USING THE RESIN COMPOSITION

(75) Inventors: Kenichi Ohkawa, Ichihara (JP); Moriyasu Shimojo, Ichihara (JP); Isao Takashima, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 154 days.

(21) Appl. No.: 10/231,336

(22) Filed: Aug. 30, 2002

(65) Prior Publication Data

US 2003/0060553 A1 Mar. 27, 2003

(30) Foreign Application Priority Data

Sep. 3, 2001 (JP) .......................................... 2001-265494

(51) Int. Cl.[7] ................................................. C08K 5/10
(52) U.S. Cl. ........................ 524/318; 524/423; 524/451
(58) Field of Search ................................. 524/318, 423, 524/451

(56) References Cited

U.S. PATENT DOCUMENTS

| 5,391,618 A | 2/1995 | Yamamoto et al. |
| 5,723,527 A | 3/1998 | Sadatoshi et al. |

FOREIGN PATENT DOCUMENTS

| EP | 0 511 020 A2 | 10/1992 |
| EP | 0 739 943 A1 | 10/1996 |
| EP | 0 831 125 A1 | 3/1998 |
| JP | 5-311018 A | 11/1993 |
| JP | 6-192500 A | 7/1994 |
| JP | 8-041257 A | 2/1996 |
| JP | 8-302108 A | 11/1996 |

*Primary Examiner*—Peter D. Mulcahy
(74) *Attorney, Agent, or Firm*—Sughrue Mion, PLLC

(57) ABSTRACT

Disclosed is a polypropylene resin composition comprising (A) from 40 to 98% by weight of polypropylene resin, (B) from 1 to 30% by weight of basic magnesium sulfate fiber having a surface treated with montan wax wherein fibers contained in primary fibers have an average fiber length of from 7 to 10 $\mu$m and the percentage of primary fibers containing fibers having a fiber length of 20 $\mu$m or more is 10% by weight or less and (C) from 1 to 30% by weight of talc, provided that the total weight of the components (A), (B) and (C) is adjusted to 100% by weight.

3 Claims, No Drawings

BASIC MAGNESIUM SULFATE FIBER-REINFORCED POLYPROPYLENE RESIN COMPOSITION AND INJECTION MOLDED ARTICLE USING THE RESIN COMPOSITION

BACKGROUND OF THE INVENTION

1. Field of the Invention

The present invention relates to a polypropylene resin composition and to an injection molded article obtained by use of the resin composition. In particular, the present invention relates to a polypropylene resin composition excellent in rigidity and impact strength, particularly in impact strength at low temperature, and to an injection molded article obtained by use of the resin composition.

2. Description of the Related Art

Polypropylene resins are widely employed for molded articles, etc. due to their excellent mechanical properties and processabilities. In particular, they are used in automotive materials that are required to have excellent impact strength, rigidity and thermal properties such as thermal distortion temperature.

Heretofore known are blending an ethylene-α-olefin random copolymer or a vinyl aromatic compound to a polypropylene resin in order to improve the impact strength of polypropylene resins, and blending a filler such as talc to a polypropylene resin in order to improve the impact strength or thermal properties such as thermal distortion temperature.

For example, Japanese Patent Laid-Open No. 6-192500 discloses a propylene-based resin composition comprising a propylene-based polymer and an ethylene-α-olefin copolymer with a flexural modulus of 2000 kg/cm$^2$ or less, the resin composition having an improved impact resistance at normal temperature and an improved impact resistance at low temperature and having a well-balanced physical properties including rigidity and impact resistance. Further, it also discloses that fillers such as talc, and polystyrene resin and styrene-butadiene rubber can be blended.

In addition, Japanese Patent Laid-Open No. 8-302108 discloses a thermoplastic resin composition containing a crystalline polypropylene, an ethylene-butene-1 copolymer rubber, an ethylene-propylene copolymer rubber and talc, the resin composition being excellent in rigidity and impact resistance and requiring a short molding cycle as an injection molding processability.

However, the propylene-based resin composition and thermoplastic resin composition described in the above-cited publications of patent applications are still insufficient in rigidity and impact strength, particularly, in impact strength at low temperature and, therefore, further improvement is desired.

SUMMARY OF THE INVENTION

The object of the present invention is to provide a polypropylene resin composition excellent in rigidity and impact strength, particularly in impact strength at low temperature, and to provide an injection molded article obtained by use of the resin composition.

The present invention provides a polypropylene resin composition comprising (A) from 40 to 98% by weight of polypropylene resin, (B) from 1 to 30% by weight of basic magnesium sulfate fiber having a surface treated with montan wax wherein fibers contained in primary fibers have an average fiber length of from 7 to 10 μm and the percentage of primary fibers containing fibers having a fiber length of 20 μm or more is 10% by weight or less and (C) from 1 to 30% by weight of talc, provided that the total weight of the components (A), (B) and (C) is adjusted to 100% by weight. The present invention also provides an injection molded article obtained by use of the foregoing resin composition.

DETAILED DESCRIPTION OF PREFERRED EMBODIMENTS

The polypropylene (A) used in the present invention is not particularly restricted and is exemplified by homopolymers of propylene and copolymers of propylene with ethylene and/or α-olefin. The polypropylene (A) is preferably a polypropylene resin having crystallinity, examples of which include a crystalline propylene homopolymer, a crystalline ethylene-propylene copolymer, a crystalline propylene-α-olefin copolymer, etc. These may be used singly or in combination of two or more of them.

The α-olefin to be used for the crystalline propylene-α-olefin copolymer includes α-olefins having at least four carbon atoms, preferably α-olefins having from 4 to 20 carbon atoms, and more preferably α-olefins having from 4 to 12 carbon atoms, examples of which include butene-1, pentene-1, hexene-1, heptene-1, octene-1 and decene-1. Examples of the crystalline propylene-α-olefin copolymer include a crystalline propylene-butene-1 copolymer, a crystalline propylene-hexene-1 copolymer, etc.

The polypropylene resin having crystallinity is preferably a crystalline propylene homopolymer, a crystalline ethylene-propylene block copolymer or a mixture thereof. Particularly preferred is a crystalline ethylene-propylene block copolymer or a mixture of a crystalline ethylene-propylene block copolymer and a crystalline propylene homopolymer.

The crystalline ethylene-propylene block copolymer to be used in the present invention is a crystalline ethylene-propylene block copolymer comprising a propylene homopolymer portion, which is referred to as a first segment, and an ethylene-propylene random copolymer portion, which is referred to as a second segment.

The crystalline ethylene-propylene block copolymer used in the present invention is preferably a crystalline ethylene-propylene block copolymer wherein the aforementioned propylene homopolymer portion (the first segment) has a limiting viscosity number $[\eta]_p$ of from 0.7 to 2.0 dl/g and the propylene homopolymer portion (the first segment) has an isotactic pentad fraction determined by $^{13}$C-NMR of 0.97 or more.

The content of the polypropylene resin (A) to be used in the present invention is from 40 to 98% by weight, preferably from 50 to 88% by weight. If the content of the polypropylene resin (A) is less than 40% by weight, the impact resistance may be insufficient, whereas if the content exceeds 98% by weight, the rigidity may be insufficient.

The process for producing the polypropylene resin (A) to be used in the present invention is not particularly restricted, and is exemplified by bulk polymerization, solution polymerization, slurry polymerization, and gas phase polymerization, which are known processes and may be in either a batch mode or a continuous mode, using a known stereoregular olefin polymerization catalyst, e.g., known Ziegler-Natta catalysts, metallocene catalysts, and catalysts comprising combinations thereof, or a production process in which the foregoing polymerization methods are optionally combined. Preferred is continuous gas phase polymerization.

The process for producing the crystalline ethylene-propylene block copolymer is preferably a production process in which, in a first stage, propylene is homopolymerized in the presence of a stereoregular olefin polymerization catalyst to obtain a crystalline propylene homopolymer portion, which is the first segment, and subsequently, in a second stage, ethylene and propylene are copolymerized to obtain an ethylene-propylene random copolymer portion, which is the second segment.

The basic magnesium sulfate fiber (B) to be used in the present invention may be a basic magnesium sulfate fiber obtained by wet-treating, with a dispersion device capable of exhibiting a high shearing effect, a slurry of basic magnesium sulfate which is obtained by hydrothermal synthesis using magnesium sulfate and magnesium hydroxide or magnesium oxide as raw materials and fibers of which are entangled together and aggregated, thereby disentangling and dispersing the basic magnesium sulfate fibers entangled together and aggregated, simultaneously breaking fibers having a length of 20 $\mu$m or more so as to adjust the average fiber length to 7-10 $\mu$m, heating the whole fibers, treating their surfaces with montan wax, filtering, dewatering, and drying.

Fibers contained in primary fibers of the basic magnesium sulfate fiber (B) to be used in the present invention has an average fiber length of from 7 to 10 $\mu$m, preferably from 8 to 9.5 $\mu$m. If the average fiber length of the fibers contained in the primary fibers of the basic magnesium sulfate fiber is smaller than 7 $\mu$m, the rigidity may be insufficient, whereas when exceeding 10 $\mu$m, the impact resistance may be insufficient.

In the basic magnesium sulfate fiber (B) to be used in the present invention, the percentage of primary fibers containing fibers having a fiber length of 20 $\mu$m or more is 10% by weight or less, preferably 8% by weight or less, provided that the total weight of the basic magnesium sulfate fiber (B) is let be 100% by weight. If the percentage of primary fibers containing fibers having a fiber length of 20 $\mu$m or more exceeds 10% by weight, the impact resistance may be insufficient.

The basic magnesium sulfate fiber (B) to be used in the present invention is a basic magnesium sulfate fiber having a surface treated with montan wax. If the surface is not treated with montan wax, the impact strength or the impact strength at low temperature may be insufficient.

Montan wax is a montanic acid ester, which is a wax. Montanic acid is extracted from lignite and mainly comprises a saturated carboxylic acid having from 28 to 32 carbon atoms.

Montan wax may be one available in the market. Examples thereof include Hoechst Wax OP manufactured by Hoechst. This is a product obtained by esterifying a part of montanic acid with butylene glycol and saponifying the remaining part of that acid with calcium hydroxide.

The process for producing the basic magnesium sulfate fiber (B) to be used in the present invention is a process comprising wet-treating, with a dispersion device capable of exhibiting a high shearing effect, a slurry of basic magnesium sulfate which is obtained by hydrothermal synthesis using magnesium sulfate and magnesium hydroxide or magnesium oxide as raw materials and fibers of which are entangled together and aggregated, thereby disentangling and dispersing the basic magnesium sulfate fibers entangled together and aggregated, simultaneously breaking fibers having a length of 20 $\mu$m or more so as to adjust the average fiber length to 7-10 $\mu$m, heating the whole fibers, treating their surfaces with montan wax, filtering, dewatering, and drying.

Describing in more detail, in the aforementioned production process, magnesium hydroxide or magnesium oxide is dispersed in an aqueous magnesium sulfate solution first. Since it is necessary only to allow magnesium sulfate to exist together with magnesium hydroxide in a reaction system, it is also possible to obtain magnesium sulfate from sulfuric acid and magnesium hydroxide.

The concentration of the aqueous magnesium sulfate solution may be adjusted properly depending upon the reaction temperature and the concentration of magnesium hydroxide or magnesium oxide to be dispersed. However, it is usually from 1.5 to 5 mol/L, preferably from 2 to 4 mol/L from the viewpoints of lowering the reaction temperature, the stability of $2MgSO_4.Mg(OH)_2.3H_2O$ to be formed, and economical efficiency.

The concentration of the magnesium hydroxide or magnesium oxide to be dispersed is preferably 10% by weight or less, more preferably from 1 to 6% by weight from the viewpoints of the viscosity of the $2MgSO_4.Mg(OH)_2.3H_2O$ slurry to be formed and the ease of stirring.

The reaction temperature of the hydrothermal synthesis is usually from 100 to 200° C., preferably from 130 to 180° C. from the viewpoints of lowering the concentration of magnesium sulfate, shortening the reacting temperature, and the economical efficiency. The pressure in the hydrothermal reaction is usually from 1 to 15 kg/cm$^2$, preferably from 3 to 10 kg/cm$^2$. Since that hydrothermal reaction is a solid-liquid reaction, it is usually carried out under stirring so that the solid comes fully into contact with the liquid. The reaction time is usually from 0.1 to 5 hours.

The $2MgSO_4.Mg(OH)_2.3H_2O$ contained in the $2MgSO_4.Mg(OH)_2.3H_2O$ slurry obtained by the aforementioned process is a compound in a state where fibers having a length of about several micrometers to 50 $\mu$m and a diameter of from 0.1 to 1 $\mu$m are aggregated.

Next, the resulting $2MgSO_4.Mg(OH)_2.3H_2O$ slurry is subjected to a dispersion treatment using a dispersion device and thereby the fibers aggregated are disentangled and dispersed into primary fibers. This operation can break the fibers with a fiber length of 20 $\mu$m or more contained in the $2MgSO_4.Mg(OH)_2.3H_2O$ slurry and makes it possible to control the reaggregation of fibers caused by entangle of long fibers in subsequent steps.

Ordinary dispersion devices for slurries can be employed as the dispersion device. Preferred are high-pressure or high-rotation type dispersion devices capable of applying a high shearing force. Examples thereof include homogenizers (e.g., POLYTRON and MEGATRON, available from KINMATICA Inc.)

Further, the slurry resulting from the dispersion treatment in the above-mentioned method is heated and the surface of $2MgSO_4.Mg(OH)_2.3H_2O$ is treated with montan wax. Though montan wax is insoluble in water, the treatment can be achieved in a relatively short time by adding the wax to a slurry heated and stirring the mixture. Montan wax may be added in either a powdery form or a block form. Preferred is the addition in a powdery form.

The temperature of the slurry at the time of addition of montan wax is usually a relatively low temperature of from 50 to 85° C. When montan wax is added, it is preferable to stir with a low-speed stirrer for a period of 20 minutes or more.

The slurry treated with montan wax is subsequently subjected to filtration, dewatering and drying in usual methods, yielding the basic magnesium sulfate fiber (B) to be used in the present. The basic magnesium sulfate fiber (B)

to be used in the present may also be granulated into a densely granular, granular or cottony form.

The talc (C) to be used in the present invention is not particularly restricted and is usually a matter obtained by pulverizing of hydrated magnesium silicate. The crystal structure of the branches of the matter is a pyrophylite type three-layer structure. Talc is made up of a laminate of this structure.

The content of the talc to be used in the present invention is from 1 to 30% by weight, preferably from 5 to 25% by weight. If the content of talc is less than 1% by weight, the rigidity may be insufficient. If the content of talc exceeds 30% by weight, the impact resistance may be insufficient.

The average particle size of the talc to be used in the present invention is not particularly limited, but it is preferably 4 µm or less from the viewpoint of impact resistance. By the average particle diameter of talc is meant a 50% equivalent particle diameter $D_{50}$ calculated from an integrated distribution curve by sieving analysis measured by suspending talc in a dispersion medium such as water, alcohol, or the like using a centrifugal sedimentation particle size distribution analyzer.

The talc (C) to be used in the present invention may be employed as received without any treatment. Alternatively, it may be employed after the treatment of its surface using a variety of known silane couplers, titanium couplers, or surfactants such as higher fatty acids, higher fatty acid esters, higher fatty acid amides, higher fatty acid salts and the like in order to improve the interfacial adhesiveness to the polypropylene resin (A) and to improve the dispersibility.

The process for producing the polypropylene resin composition of the present invention may be those using a kneading device such as a single screw extruder, a twin screw extruder, a Banbury mixer and a hot roll. The addition of the ingredients to a kneading device and the mixing of the ingredients may be performed simultaneously or in installments. Such methods are exemplified by, but are not restricted to, the following methods.

(Method 1) A method in which polypropylene resin (A) and basic magnesium sulfate fiber (B) are kneaded together and then talc (C) is added and stirred.
(Method 2) A method in which polypropylene resin (A) and talc (C) are kneaded together and then basic magnesium sulfate fiber (B) is added and stirred.
(Method 3) A method in which polypropylene resin (A) and basic magnesium sulfate fiber (B) are kneaded in advance to form a master batch, which is then diluted with polypropylene resin (A) and then talc (C) is added and stirred,
(Method 4) A method in which polypropylene resin (A) and talc (C) are kneaded together in advance to form a master batch, which is then diluted with polypropylene resin CA) and basic magnesium sulfate fiber (B) is added and stirred.
(Method 5) A method in which polypropylene (A) and basic magnesium sulfate fiber (B), and polypropylene resin (A) and talc (C), respectively, are kneaded in advance, and eventually combining the kneaded matters and kneading the mixture.

The kneading temperature is usually from 170 to 250° C., preferably from 190 to 230° C. The kneading time is usually from 1 to 20 minutes, preferably from 3 to 15 minutes.

Unless the object of the present invention is damaged, to the polypropylene resin composition of the present invention may, as required, be added additives such as antioxidants, ultraviolet absorbers, lubricants, pigments, antistatic agents, copper inhibitors, flame retarders, neutralizers, blowing agents, plasticizers, nucleating agents, antifoaming agents, and crosslinking agent.

The polypropylene resin composition of the present invention can be formed into injection-molded articles by a well-known injection molding technique. In particular, the resin composition is suitably used as injection-molded articles for automobiles, such as door trims, pillars, instrument panels and bumpers.

EXAMPLES

The present invention is described by way of Examples and Comparative Examples. However, the invention is not restricted to the Examples.

First, shown are Production Example 1 of the basic magnesium sulfate fiber (B) to be used in the present invention and Comparative Production Examples 1 to 3 of basic magnesium sulfate fibers that do not satisfy the requirements for the basic magnesium sulfate fiber (B) to be used in the present invention.

Production Example 1

One liter of a 3.0 mol/L aqueous magnesium sulfate solution was prepared by dissolving magnesium sulfate pentahydrate in water and then 40 g of magnesium hydroxide was added and fully dispersed. Thereafter, the mixture was placed in an autoclave and was allowed to react for 2 hours at a temperature of 160° C. and a pressure of 6 kg/cm$^2$·G for 2 hours, yielding 1 L of slurry.

Using a dispersion device, homogenizer, manufactured by Gaulin, a dispersion treatment was carried out at a pressure of 150 kg/cm$^2$·G. After heating the dispersion slurry to 60° C., surface treatment was carried out by adding 1.5 g (corresponding to 3% of solid (A) formed) of Montan Wax OP manufactured by Hoechst and stirring for 30 minutes. The slurry was filtered, washed and dried, yielding 50 g of solid (A).

A rational formula, $2MgSO_4 \cdot Mg(OH)_2 \cdot 3H_2O$, was obtained as a result of analysis. Physical properties of solid (A) are shown in Table 1.

Comparative Production Example 1

One liter of slurry prepared by use of an autoclave as in Production Example 1 was heated to 60° C. Thereafter, surface treatment was carried out by adding 1.5 g (corresponding to 3% of solid (B) formed) of Montan Wax OP manufactured by Hoechst and stirring for 30 minutes. The slurry was filtered, washed and dried, yielding 50 g of solid (B).

A rational formula, $2MgSO_4 \cdot Mg(OH)_2 \cdot 3H_2O$, was obtained as a result of analysis. Physical properties of solid (B) are shown in Table 1.

Comparative Production Example 2

One liter of slurry prepared by use of an autoclave as in Production Example 1 was subjected to dispersion treatment at a pressure of 150 kg/cm$^2$·G using a dispersion device, homogenizer, manufactured by Gaulin. Thereafter, the resulting slurry was filtered, washed and dried, yielding 50 g of solid (C).

A rational formula, $2MgSO_4 \cdot Mg(OH)_2 \cdot 3H_2O$, was obtained as a result of analysis. Physical properties of solid (C) are shown in Table 1.

Comparative Production Example 3

One liter of slurry prepared by use of an autoclave as in Production Example 1, as received, was filtered, washed and dried, yielding 50 g of solid (D).

A rational formula, $2MgSO_4 \cdot Mg(OH)_2 \cdot 3H_2O$, was obtained as a result of analysis. Physical properties of solid (D) are shown in Table 1.

EXAMPLES

Example 1 and Comparative Examples 1 to 3 are shown for a polypropylene resin composition using the basic magnesium sulfate fiber obtained in the foregoing Example 1 and an injection molding using the resin composition and for polypropylene resin compositions using the basic magnesium sulfate fibers obtained in Comparative Production Examples 1 to 3 and injection-molded articles using the resin compositions.

Physical properties of the injection-molded articles were measured according to the following methods.

(1) Flexural Modulus (FM, unit: $kg/cm^2$)

According to JIS K7203, flexural modulus was measured at a span of 54 mm and a loading speed of 2 mm/min using a 3.2 mm thick test piece.

(2) Izod Impact Strength (IZOD, unit: $kg \cdot cm/cm^2$)

According to JIS K7110, Izod impact strength was measured at 23° C. using a 3.2 mm thick test piece that was notched after molding.

(3) Falling-Weight Impact Strength (FWI, unit: $kg \cdot cm$)

According to JIS K7211, the presence of failure was checked using a flat plate with a size of 100 mm×100 mm×3 mm (thickness) as a test piece, at a test temperature of 23° C. or −10° C., under conditions: a dart diameter of 1/2R, a holder diameter of 2 inches and a load of 3 kg. From the dropping height at 50% failure, the failure energy (height×3 kg) was calculated.

Example 1

(1-1) Pellets

80% by weight of polypropylene (block copolymer, manufactured by Sumitomo Chemical Co., Ltd., Noblene AZ630V2), 15% by weight of talc (manufactured by Nippon Talc Co., Ltd, JR37, average particle size: 3 μm) and 5% by weight of solid (A) obtained in the above-described Production Example 1 were mixed collectively with a tumbler mixer, kneaded with a twin screw kneader (TEX-44) at a cylinder temperature of 200° C. and palletized. Thus, pellets were obtained.

(1-2) Injection-Molded Article

An injection-molded article was obtained by injection molding the pellets obtained in the above (1-1) using an injection molding device (Toshiba IS150) at a cylinder temperature of 220° C. and a mold temperature of 50° C. The physical properties of the resulting injection-molded article were measured and the results are shown in Table 2.

Comparative Example 1

Pellets and an injection-molded article were obtained in the same manner as that of Example 1 except that solid (A) used in Example 1 was changed to solid (B) obtained in Comparative Production Example 1 described above. Physical properties of the injection-molded article obtained were measured and the results are shown in Table 2.

Comparative Example 2

Pellets and an injection-molded article were obtained in the same manner as that of Example 1 except that solid (A) used in Example 1 was changed to solid (C) obtained in Comparative Production Example 2 described above. Physical properties of the injection-molded article obtained were measured and the results are shown in Table 2.

Comparative Example 3

Pellets and an injection-molded article were obtained in the same manner as that of Example 1 except that solid (A) used in Example 1 was changed to solid (D) obtained in Comparative Production Example 3 described above. Physical properties of the injection-molded article obtained were measured and the results are shown in Table 2.

TABLE 1

|  | Production Example 1 | Comparative Production Example 1 | Comparative Production Example 2 | Comparative Production Example 3 |
|---|---|---|---|---|
| Dispersion treatment | Done | Not done | Done | Not done |
| Montan wax | Used | Used | Not used | Not used |
| Average fiber length μm | 9.3 | 14.8 | 9.3 | 12.1 |
| Percentage of primary fibers containing fiber having a fiber length of 20 μm or more | 6.2 | 23.1 | 4.5 | 22.8 |

TABLE 2

|  | Flexural modulus (FM) | Izod impact strength (IZOD) | Falling-weight impact strength (FWI) kg · cm | |
|---|---|---|---|---|
|  | $kg/cm^2$ | $kg \cdot cm/cm^2$ | 23° C. | −10° C. |
| Example 1 | 31400 | 4.3 | 301 | 125 |
| Comparative Example 1 | 31500 | 3.8 | 289 | 83 |
| Comparative Example 2 | 31600 | 3.9 | 298 | 83 |
| Comparative Example 3 | 31800 | 4.2 | 294 | 74 |

Example 1 is a polypropylene resin composition using basic magnesium sulfate fibers obtained in Production Example 1, the composition satisfying the feature of the present invention, and an injection-molded article obtained using the resin composition. It is clear that the products are excellent in rigidity and impact strength, especially impact strength at low temperature.

Contrary to this, Comparative Example 1 is a polypropylene resin composition using a basic magnesium sulfate fiber obtained in Comparative Production Example 1, the composition not satisfying a feature of the present invention, that is, the average fiber length and the percentage of primary fibers containing fibers having a fiber length of 20 μm or more, and an injection-molded article obtained using the resin composition. It is clear that the products are insufficient in impact strength, especially impact strength at low temperature.

Comparative Example 2 is a polypropylene resin composition using a basic magnesium sulfate fiber free of surface treatment with montan wax, which is a feature of the present invention, obtained in Comparative Production Example 2, and an injection-molded article obtained using the resin composition. It is clear that the products are insufficient in impact strength, especially impact strength at low temperature.

Comparative Example 3 is a polypropylene resin composition using a basic magnesium sulfate fiber free of surface treatment with montan wax obtained in Comparative Production Example 3 which does not satisfy a feature of the present invention, that is, the average fiber length and the ratio of primary fibers containing fibers having a fiber length of 20 μm or more, and an injection-molded article obtained using the resin composition. It is clear that the products are insufficient especially in impact strength at low temperature.

As described above in detail, according to the present invention, a polypropylene resin composition excellent in rigidity and impact strength, especially impact strength at low temperature is obtained. An injection-molded article is also obtained using the polypropylene resin composition.

What is claimed is:

1. A polypropylene resin composition comprising (A) from 40 to 98% by weight of polypropylene resin, (B) from 1 to 30% by weight of basic magnesium sulfate fiber having a surface treated with montan wax wherein fibers contained in primary fibers have an average fiber length of from 7 to 10 μm and the percentage of primary fibers containing fibers having a fiber length of 20 μm or more is 10% by weight or less, and (C) from 1 to 30% by weight of talc, provided that the total weight of the components (A), (B) and (C) is adjusted to 100% by weight.

2. The polypropylene resin composition according to claim 1, wherein the polypropylene resin (A) is a crystalline ethylene-propylene block copolymer comprising a propylene homopolymer portion and an ethylene-propylene random copolymer portion, wherein the propylene homopolymer portion has a limiting viscosity number $[\eta]_p$ of from 0.7 to 2.0 dl/g and the propylene homopolymer portion has an isotactic pentad fraction determined by $^{13}$C-NMR of 0.97 or more.

3. An injection molded article obtained by use of the polypropylene resin composition according to claim 1 or 2.

* * * * *